(12) United States Patent
Parker et al.

(10) Patent No.: US 8,577,391 B2
(45) Date of Patent: Nov. 5, 2013

(54) PROVIDING A LOCATION-BASED SERVICE USING REAL-TIME RADIO ACCESS NETWORK (RAN) MODELING

(75) Inventors: Benjamin J. Parker, Vacaville, CA (US); Chris S. Neisinger, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 13/077,178

(22) Filed: Mar. 31, 2011

(65) Prior Publication Data
US 2012/0252494 A1 Oct. 4, 2012

(51) Int. Cl.
*H04W 24/00* (2009.01)
(52) U.S. Cl.
USPC .......... 455/456.3; 455/456.1; 455/456.2
(58) Field of Classification Search
USPC ................ 455/456.1, 456.2, 456.3
See application file for complete search history.

(56) References Cited

U.S. PATENT DOCUMENTS

| | | | |
|---|---|---|---|
| 6,791,472 B1 * | 9/2004 | Hoffberg | 340/905 |
| 6,813,501 B2 * | 11/2004 | Kinnunen et al. | 455/456.2 |
| 7,848,765 B2 * | 12/2010 | Phillips et al. | 455/456.3 |
| 2012/0258697 A1 * | 10/2012 | Fitzpatrick et al. | 455/414.2 |
| 2012/0307676 A1 * | 12/2012 | Chan et al. | 370/252 |

* cited by examiner

*Primary Examiner* — Temica M Beamer

(57) ABSTRACT

A system is configured to receive information associated with a flow being transported via a cell within a radio access network (RAN) associated with a service provider network; identify a user device, associated with the flow, based on the information; identify a location of the device based on a location of the cell; generate a group of codes based on the location, the codes corresponding to a group of code lengths and representing one or more quantities of error associated with the location, where a particular code is associated with a code length that corresponds to a quantity of error; and transmit the codes to a content provider, where the codes enable the content provider to obtain the quantity of error that corresponds to a geographical boundary in which the user device is located, and target content, associated with an advertiser within the boundary, to the user device.

21 Claims, 7 Drawing Sheets

| SOURCE ADDRESS 410 | DESTINATION ADDRESS 415 | CELL ID 420 | BASE STATION ID 425 | CONTENT TYPE 430 |
|---|---|---|---|---|
| IP1 | IP-A | 1-C1 | 120-1 | STREAMING VIDEO |
| IP2 | IP-B | 1-C2 | 120-2 | CALL |
| IP3 | IP-C | K-C1 | 120-K | SMS |
| ... | ... | ... | ... | ... |

| CELL ID 602 | CELL SITE LOCATION 604 | UD ID 606 | TIME AT LOCATION 608 |
|---|---|---|---|
| CODE LENGTH 610 | LATITUDE CODE 612 | LONGITUDE CODE 614 | ERROR CODE 616 |
| LENGTH0 | LAT0 | LONG0 | MAX ERROR |
| LENGTH1 | LAT1 | LONG1 | ERROR1 |
| LENGTH2 | LAT2 | LONG2 | ERROR2 |
| LENGTH 3 | LAT3 | LONG3 | ERROR3 |

FIG. 6

PROVIDING A LOCATION-BASED SERVICE USING REAL-TIME RADIO ACCESS NETWORK (RAN) MODELING

BACKGROUND

Service provider networks transport network traffic associated with a variety of services, applications, and content. The network traffic may include voice, text, video and/or data. Service provider networks are sized and/or scaled in order to transport an increasing quantity of traffic that is sent by and/or received from an increasing number of users and/or content providers. Additionally, the increase in the quantity of traffic corresponds to an expanding demand for various types of services, applications, and/or content.

Unfortunately, the service provider networks transport content or services to user devices in a manner that is not always tailored to the user devices. Further, as the service provider networks transport the increasing quantity of traffic, the service provider networks do not always have the capacity to process the traffic in a manner that tailors the content or the services to the user devices.

BRIEF DESCRIPTION OF THE DRAWINGS

FIG. 4 is a diagram of an example data structure that stores information associated with traffic being transported, to and/or from a user device, via a radio access network associated with a service provider network;

FIG. 6 is a diagram of an example data structure that stores encoded location information associated with a user device that is communicating via a radio access network.

DETAILED DESCRIPTION OF PREFERRED EMBODIMENTS

Figure 1:
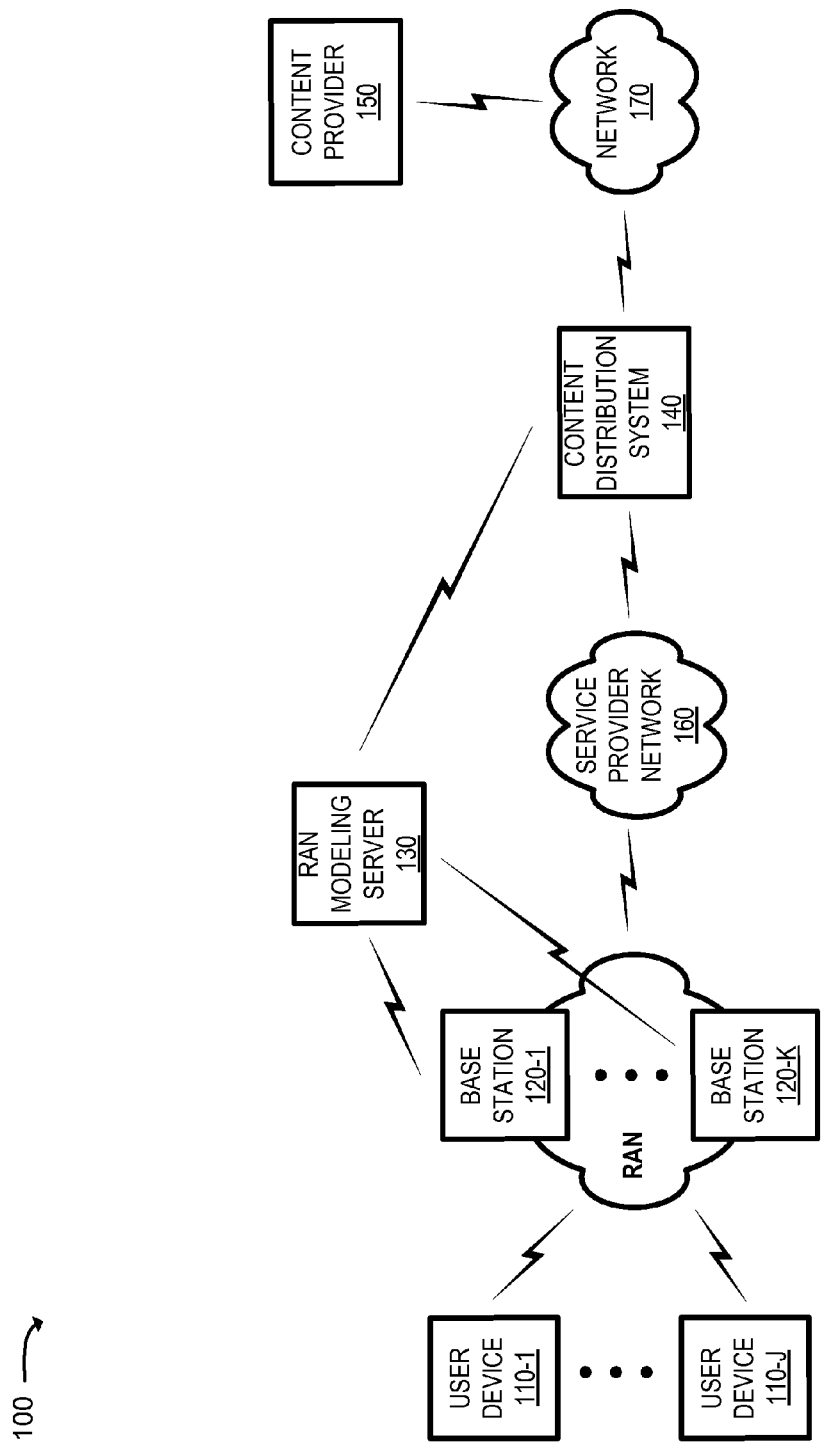
FIG. 1 is a diagram of an example environment in which systems and/or methods, described herein, may be implemented.

The following detailed description refers to the accompanying drawings. The same reference numbers in different drawings may identify the same or similar elements.

Systems and/or methods, described herein, may enable information, associated with traffic being transported over a radio access network (RAN), to be dynamically obtained on a real-time basis. The information associated with the traffic may be used to identify a cell, within the RAN, via which a user device is communicating with a service provider network associated with the RAN. The identified cell may permit information associated with a location of the user device (hereinafter referred to as "location information") to be obtained and encoded for use by a content provider to provide content that is uniquely tailored (hereinafter referred to as "customized content") for the user device.

As described herein, a RAN modeling server may perform a RAN modeling operation by monitoring traffic flowing to and/or from the service provider network via the RAN. The RAN modeling server may monitor packets, associated with the traffic, that are being transported over the RAN via cells that serve one or more user devices. The RAN modeling server may obtain information associated with the traffic based on the packet monitoring. The RAN modeling server may forward the information associated with the traffic to a content distribution system associated with the service provider network.

As also described herein, an analytics and reporting (AR) server, associated with the content distribution system, may used the information associated with the traffic to generate one or more location codes based on a location associated with a cell via which the user device is communicating. The AR server may, for example, generate location information, associated with the user device, based on a particular geographical location associated with a cell that is serving the user device.

The AR server may encode the location information to create one or more location codes each having a different code length (e.g., a different quantity of characters, values, bits, etc.). The location codes may correspond to a particular location associated with a site of the cell via which the user device is communicating. Each of the location codes may represent a respective different quantity of location error relative to the particular location. The different quantities of location error may correspond to geographical areas, of different sizes, in which the cell site is located.

In one example, a location code of a particular length, when decoded by a content provider, may correspond to a geographical boundary (hereinafter referred to as a "geo fence") that encompasses a geographical area associated with the cell site within which the user device is located. In another example, another location code, of a length that is greater than the particular length, may correspond to another geo fence, associated with the cell, that encompasses another geographic area that is less than the geographical area. The other location code, when decoded, may correspond to a quantity of location error that is less than another quantity of location error associated with the location code. Generally, as a code length of a location code increases, a quantity of location error may decrease and/or a size of a corresponding geo fence, within which the user device is located, may decrease. The AR server may send one or more of the location codes to a content provider.

A content provider may generate customized content for the user device based on a length associated with a location code to which access is authorized (e.g., based on a service level agreement (SLA) and/or a key to decode the location code). The content provider may, for example, decode the location code to obtain information associated with the location of the user device and/or a quantity of location error. The content provider may use the information associated with the location and/or the quantity of location error to generate a logical geo fence that surrounds a geographical area within which the user device is located. The content provider may use the geo fence to identify advertising entities (e.g., firms or businesses for which the content provider sells advertising) that are located within the geo fence. The content provider may generate advertising content associated with the entities and may send the content to the user device.

FIG. 1 is a diagram of an example environment 100 in which systems and/or methods described herein may be implemented. As shown in FIG. 1, environment 100 may include a group of user devices 110-1, . . . , 110-J (where J≥1) (hereinafter referred to collectively as "user devices 110" and individually as "user device 110"), a group of base stations 120-1, . . . 120-K (where K≥1) (hereinafter referred to collectively as "base stations 120" and individually as "base station 120"), a radio access network (RAN) modeling server 130 (hereinafter referred to as "RAN server 130"), a content distribution system (CDS) 140, a content provider 150, a service provider network 160 and a network 170. The number of devices, systems, and/or networks, illustrated in FIG. 1, is provided for explanatory purposes only. In practice, there may be additional devices, systems, and/or networks; fewer devices, systems, and/or networks; different devices, systems, and/or networks; or differently arranged devices, systems, and/or networks than illustrated in FIG. 1.

Also, in some implementations, one or more of the devices of environment 100 may perform one or more functions described as being performed by another one or more of the devices of environment 100. For example, RAN server 130 and CDS 140 may be integrated into a single device. Devices, systems, and/or networks of environment 100 may interconnect via wired connections, wireless connections, or a combination of wired and wireless connections.

User device 110 may include any computation or communication device, such as a wireless mobile communication device that is capable of communicating with base stations 120. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a camera, a personal gaming system, a smart phone, or another type of mobile computation or communication device.

Base station 120 may include one or more devices that receive, process, and/or transmit traffic, such as voice, video, text, and/or other data, destined for and/or received from user device 110. As shown in FIG. 1, one or more base stations 120 may be associated with a RAN that receives traffic from and/or sends traffic to service provider network 160. Base station 120 may send traffic to and/or receive traffic from user device 110 via an air interface and may include one or more cells via which signals are received from and/or transmitted to user device 110.

RAN server 130 may include one or more server devices, or other types of computation or communication devices, that gather, process, search, store, and/or provide information in a manner similar to that described herein. RAN server 130 may, for example, monitor traffic being transported via cells associated with base station 120 to dynamically obtain information associated with the traffic being transported via base station 120. In one example, RAN server 130 may monitor one or more interfaces associated with signal bearers (such as, for example, an S1-U interface between base station 120 and a service gateway server (SGW) associated with service provider network 160) via which user device 110 communicates with service provider network 160. In another example, RAN server 130 may monitor one or more interfaces associated with control-plane signaling (such as, for example, an S11 interface between a mobility management entity (MME) server and the SGW and/or an S10 interface between the MME and another MME during, for example, a handover event). The control-plane signaling may control signal bearers during establishment or execution of a communication session associated with user device 110.

RAN server 130 may identify information associated with user device 110 from packets associated with the traffic. The information, associated with user device 110, may include a device identifier, a source address (e.g., an Internet protocol (IP) address), a status of user device 110 (e.g., active, dormant, off-line, etc.), etc. RAN server 130 may identify a type of traffic associated with user device 110 (e.g., streaming video, voice, data, etc.), information associated with a cell via which the traffic is being served to user device 110 (e.g., a cell identifier), information associated with a base station 120 with which the cell is associated (e.g., a base station identifier), etc. RAN server 130 may obtain information associated with a traffic load associated with the cell and/or base station 120 via which user device 110 is communicating. The information associated with the traffic load may identify a quantity of bandwidth, data rate, and/or throughput associated with the cell and/or base station 120. RAN server 130 may transmit the information associated with the traffic to CDS 140.

CDS 140 may include one or more devices that gather, process, search, store, and/or provide information in a manner similar to that described herein. CDS 140 may perform operations associated with content distribution within environment 100. For example, CDS 140 may perform caching operations by obtaining content from content provider 150 and temporarily storing the content in a memory associated with CDS 140. CDS 140 may retrieve particular content, from the memory, in response to a request to receive the particular content from user device 110. CDS 140 may, in another example, process the content in order to ensure that the content is sent to user device 110 in a manner that satisfies a quality of service (QoS) threshold. CDS 140 may, in yet another example, convert content into a format and/or protocol based on a type of user device 110. CDS 140 may process the content by sending the content, to user device 110, at a bandwidth, data rate, and/or packet size that maximizes network throughput without inducing congestion, jitter, and/or other conditions. CDS 140 may, in an example implementation, provide a location-based service that enables content to be customized for user devices 110.

For example, CDS 140 may receive, from RAN server 130, information associated with a flow that is being transported to and/or from user device 110 via the RAN. CDS 140 may, for example, identify user device 110 based on a source address obtained from the information associated with the flow. CDS 140 may, in another example, identify a cell, within the RAN, that is serving user device 110 based on the information associated with the flow. CDS 140 may use the identified cell to generate and/or encode location information associated with user device 110. CDS 140 may use the location information and/or the encoded location information to provide a location-based service to content provider 150.

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 150 may produce media streams (e.g., television broadcasts). A "media stream," as used herein, may refer to a stream of content that includes video content (e.g., a video stream), audio content (e.g., an audio stream), and/or textual content (e.g., a textual stream).

In an example implementation, content provider 150 may use a key, received from CDS 140, to decode a location code associated with user device 110. Content provider 150 may obtain, as a result of decoding the location code, information associated with a geo fence that corresponds to a geographic area within which user device 110 is located and/or is likely to be located. CDS 140 may use the geo fence to indentify advertising entities, located within the geo fence, for which CDS 140 generates advertising content for. CDS 140 may transmit advertising content, associated with the identified advertising entities, to user device 110.

Service provider network 160 may include one or more wired and/or wireless networks via which user devices 110 communicate and/or receive content. For example, service provider network 160 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, service provider network 160 may include a wide area network (WAN), a metropolitan area network (MAN), an ad hoc network, an intranet, a fiber optic-based network (e.g., a fiber optic service (FiOS) network), and/or a combination of these or other types of networks.

Network 170 may include one or more wired and/or wireless networks. For example, network 170 may include a cellular network, the PLMN, a 2G network, a 3G network, a 4G network (e.g., an LTE network), a 5G network, and/or another network. Additionally, or alternatively, network 170 may include a WAN, a MAN, a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
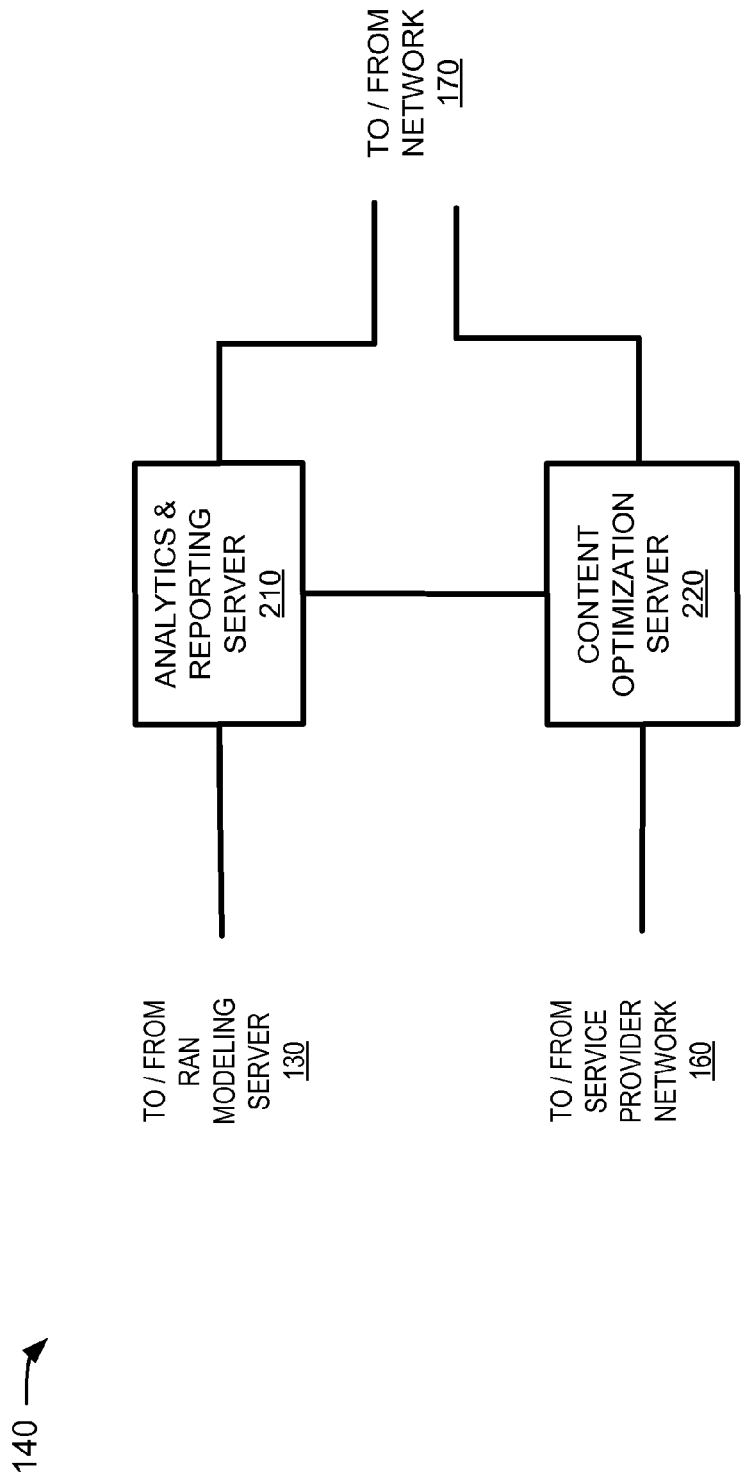
FIG. 2 is a diagram of example devices associated with a content distribution system of FIG. 1.

FIG. 2 is a diagram of example devices of CDS 140. CDS 140 may include an analytics and reporting (AR) server 210 and a content optimization (CO) server 220. Although FIG. 2 shows example devices of CDS 140, in other implementations, CDS 140 may include fewer devices, additional devices, different devices, or differently arranged devices than depicted in FIG. 2. Additionally, or alternatively, one or more devices of CDS 140 may perform one or more tasks described as being performed by one or more other devices of CDS 140.

AR server 210 may include one or more server devices, or other types of computation or communication devices, that gather, process, search, store, and/or provide information in a manner similar to that described herein. In one example implementation, AR server 210 may generate location information and/or encoded location information that may be used to provide a location-based service for CDS 140 and/or content provider 150.

AR server 210 may receive information associated with a traffic flow being transported, via a cell within the RAN, between service provider network 160 and user device 110. AR server 210 may send a query to CO server 220 to determine whether user device 110 has authorized location information to be used to track a geographic location associated with user device 110. The query may include a source address (e.g., an Internet protocol (IP) address associated with user device 110) obtained from the information associated with the traffic flow.

Based on a determination that user device 110 authorizes the use of the location information, AR server 210 may retrieve, from a memory associated with AR server 210, information associated with a geographic location that corresponds to a cell site at which the cell is located. In another example implementation, AR server 210 may obtain location information associated with user device 110 from service provider network 160 using an application programming interface (API) that enables AR server 210 to receive the location information. In yet another example implementation, AR server 210 may send a query to user device 110 to obtain the location information.

AR server 210 may generate one or more location codes based on the location information associated with user device 110. AR server 210 may, for example, encode the location information to create one or more location codes each having a different length (e.g., a different quantity of characters, values, bits, etc.). In one example, AR server 210 may generate the location codes using a hash function (e.g., Bernstein, Fowler-Noll-Vo, etc.), a cryptographic hash function, and/or some other mathematical function. Each of the location codes may be generated using a different key. Each of the location codes may be decoded using a respective different key.

The location codes may, when decoded, correspond to a particular location associated with the cell site and/or user device 110, and/or different quantities of location error associated with the particular location. A location code may, for example, correspond to a quantity of location error relative to the particular location based on a length associated with the location code. The quantity of location error may be associated with a geo fence that encompasses a geographic area within which the cell site and/or user device 110 are located. Another location code may, for example, correspond to another quantity of location error associated with the particular location. The other location code may correspond to another quantity of location error relative to the particular location based on a different length associated with the other location code. The other quantity of location error may be associated with another geo fence that encompasses another geographic area (e.g., that is greater than or less than the geographical area) within which the cell site and/or user device 110 are located. AR server 210 may transmit the one or more location codes to content provider 150. Additionally, AR server 210 may transmit a key that corresponds to one of the location codes that enables content provider 150 to decode a location code to which the key corresponds. AR server 210 may select which key to transmit to content provider 150 based on a service level agreement (SLA) that identifies a level of location error to which content provider 150 has subscribed and/or is authorized to access.

CO server 220 may include one or more server devices, or other types of computation or communication devices, that gather, process, search, store, and/or provide information in a manner similar to that described herein. In one example implementation, CO server 220 may perform content optimization operations on content being served to user devices 110. For example, CO server 220 may process content, destined for user device 110, to maximize throughput and/or avoid congestion while being transported over service provider network 160 and/or the RAN associated with service provider network 160. CO server 220 may, in another example, process the content to meet a level of QoS specified in a service level agreement (SLA) associated with a particular content provider 150 from which the content originates. CO server 220 may, in yet another example, convert the content to a format, based on a type of user device 110, that enables the content to be received, processed, and/or rendered on user device 110 within a period of time that is less than a threshold.

CO server 220 may perform network access translation (NAT) operations on traffic being sent to and/or received from user device 110 via service provider network 160. For example, CO server 220 may translate an internal IP address (e.g., associated with service provider network 160) and/or a port range associated with the internal IP address, obtained from traffic that is received from user device 110, to a corresponding public IP address that can be used by network 170 and/or content provider 150 during a communication session with user device 110. In another example, CO server 220 may translate the public IP address, associated with traffic received from network 170 that is destined for user device 110, to an internal IP address and/or port range that can be used by service provider network 160 to send the traffic to user device 110. CO server 220 may store, as information associated with NAT bindings, information associated with the internal IP address, port range, and/or public IP address in a memory associated with CO server 220.

CO server 220 may extract and/or remove information that permits the identity of user device 110 to be determined based on traffic and/or other information that is sent to network 170 and/or content provider 150. For example, CO server 220 may remove and/or extract information, associated with user device 110, from packets (e.g., from data contained within packets, packet headers, etc.) included within the traffic being sent to network 170 and/or content provider 150. The information, associated with user device 110, may include an identifier associated with user device 110 (e.g., a mobile directory number (MDN), an electronic serial number (ESN), a subscriber identity module (SIM) universal resource identifier (URI), an international mobile subscriber identifier (IMSI), and/or other identifiers). In another example, CO server 220 may extract and/or remove information associated with a location of user device 110 (e.g., when a user, of user device 110, has not authorized the user and/or dissemination of the location of user device 110).

Figure 3:
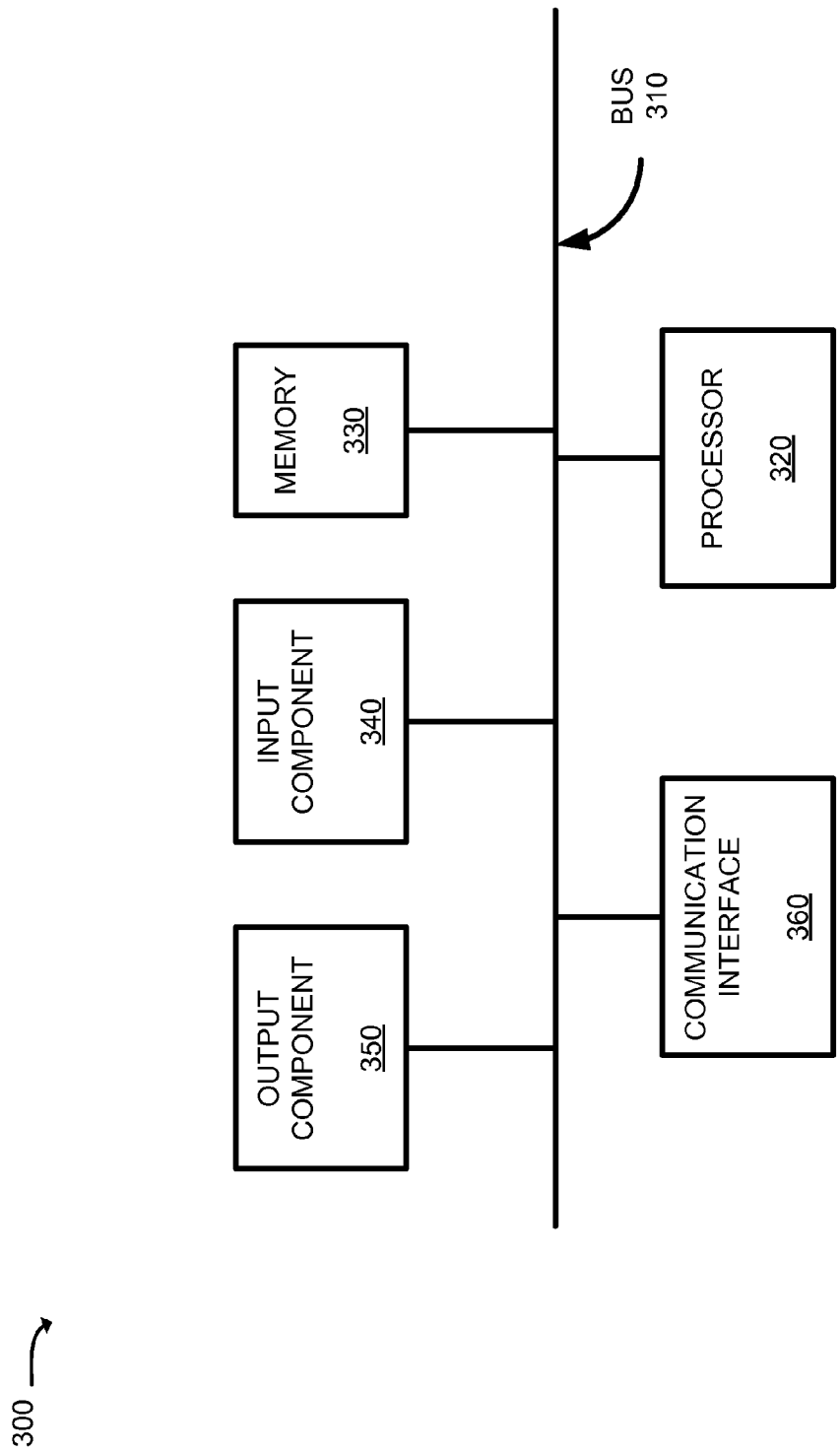
FIG. 3 is a diagram of example components of one or more of the devices of FIGS. 1 and 2.

FIG. 3 is a diagram of example components of a device 300 that may correspond to user device 110, base station 120, RAN modeling server 130, content provider 150, AR server 210, and/or CO server 220. Alternatively, each of user device 110, base station 120, RAN modeling server 130, content provider 150, AR server 210, and/or CO server 220 may include one or more devices 300. Device 300 may include a bus 310, a processor 320, a memory 330, an input component 340, an output component 350, and a communication interface 360. Although FIG. 3 shows example components of device 300, in other implementations, device 300 may contain fewer components, additional components, different components, or differently arranged components than depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Bus 310 may include a path that permits communication among the components of device 300. Processor 320 may include a processor, microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as service provider network 160 and/or network 170. In one alternative implementation, communication interface 360 may be a logical component that includes input and output ports, input and output systems, and/or other input and output components that facilitate the transmission of data to other devices.

As will be described in detail below, device 300 may perform certain operations relating to RAN modeling and/or providing a location-based service associated with service provider network 160. Device 300 may perform these operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4 is a diagram of an example data structure 400 that stores information associated with traffic being transported, to and/or from user device 100, via a RAN associated with service provider network 160. RAN server 130 may monitor the traffic and may obtain information, associated with the traffic, for storage in data structure 400. Data structure 400 may include a collection of fields, such as a source address field 410, a destination address 415, a cell identifier (ID) field 420, a base station identifier (ID) field 425, and a content type field 430. Data structure 400 includes fields 410-430 for explanatory purposes. In practice, data structure 400 may include additional fields, fewer fields, different fields, and/or differently arranged fields than are described with respect to data structure 400.

Source address field 410 may store a network address (such as, for example, an IP address, a media access control (MAC) address, telephone number, etc.) associated with user device 110. Destination address field 415 may store a network address (e.g., an IP address, a MAC address, a telephone number etc.) associated with another user device 110, content provider 150, etc., with which user device 110 is communicating.

Cell ID field 420 may store information associated with a particular cell, associated with base station 120, that serves user device 110 when communicating with service provider network 160. Base station ID field 425 may store information associated with base station 120 via which user device 110 communicates with service provider 160. Content type field 430 may identify the manner in which user device 110 is communicating with service provider network 160. For example, content type field 430 may store an indication that user device 110 is receiving streaming video via the particular cell and/or base station 120. In another example, flow type field may store an indication that user device 110 is associated with a call session and/or message session (e.g., using a short message service (SMS) protocol, a multimedia message service (MMS) protocol, an IM protocol, an email protocol, etc.) with another user device 110 via the particular cell and/or base station 120, etc.

RAN server 130 may monitor traffic being transported via one or more cells associated with base stations 120 within the RAN and may store information, associated with a traffic flow being transported to and/or from user device 110, in data structure 400. RAN server 130 may, for example, store a source address (e.g., IP1) and/or a destination address (e.g., IP-A) in data structure 400 as a result of monitoring packets associated with the traffic flow (e.g., as shown by ellipse 432). RAN server 130 may store information associated with base station 120 (e.g., 120-1) and/or an identifier associated with a cell (e.g., 1-C1) that is associated with base station 120 (e.g., as shown by ellipse 432). RAN server 130 may, based on the monitoring, identify a type of flow (e.g., streaming video) that is associated with the traffic flow (e.g., as show by ellipse 432). RAN server 130 may obtain information associated with other traffic that is being transported via other cells and/or base stations 120 within the RAN (e.g., as shown by ellipse 434).

Figure 5:
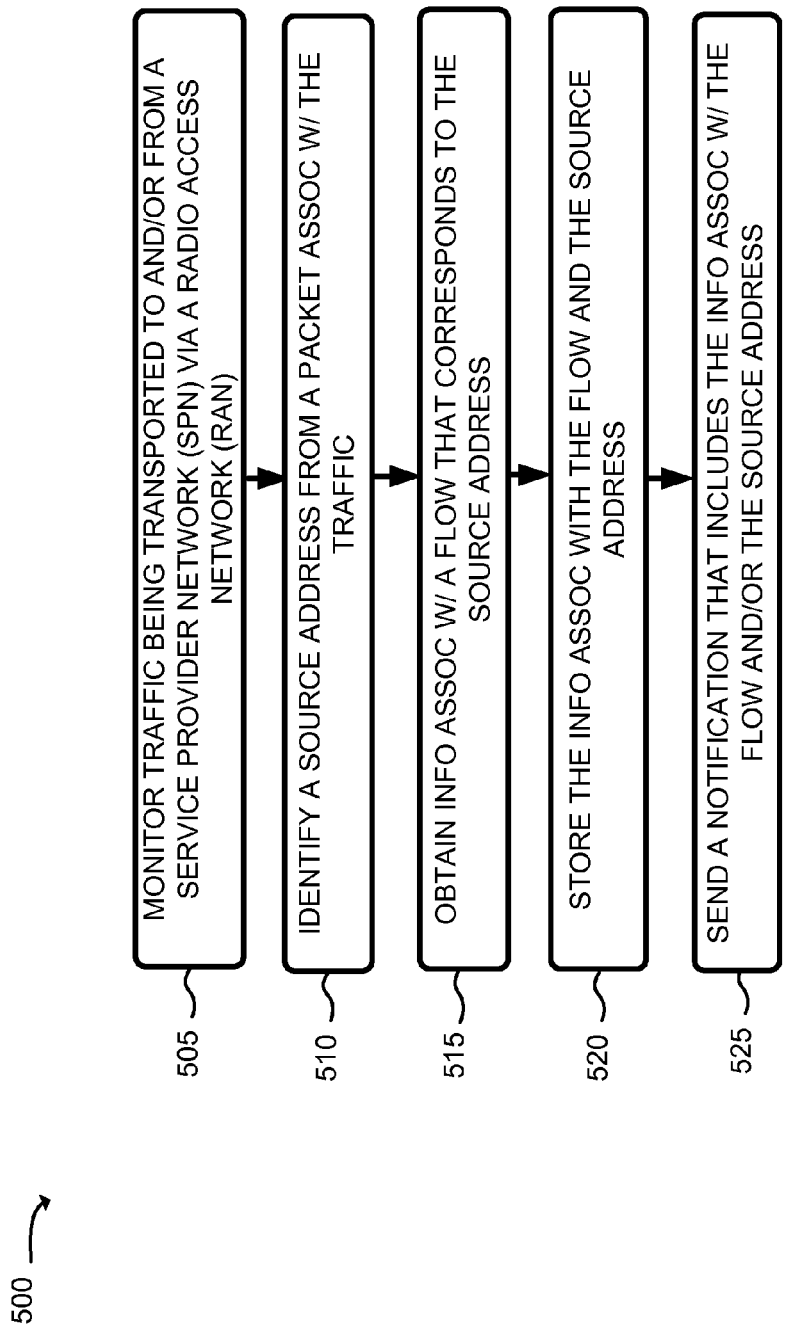
FIG. 5 is a flow chart of an example process for obtaining information associated with traffic being transported to and/or from a user device via a radio access network.

FIG. 5 is a flow chart of an example process 500 for obtaining information associated with traffic being transported to and/or from user device 110 via a RAN associated with service provider network 160. In one example implementation, process 500 may be performed by RAN server 130. In another example implementation, some or all of process 500 may be performed by a device or collection of devices separate from, or in combination with, RAN server 130.

As shown in FIG. 5, process 500 may include monitoring traffic that is being transported to and/or from a service provider network via a RAN (block 505). For example, RAN server 130 may monitor packets being transported via a RAN associated with service provider network 160. In one example, RAN server 130 may monitor packets being transmitted via interfaces associated with signal bearers (such as, for example, an S1-U interface) via which user device 110 communicates with service provider network 160. In another example, RAN server 130 may monitor one or more interfaces associated with control-plane signaling (such as, for example, an S10 interface when establishing or executing a communication session and/or an S10 interface during a handover event). When monitoring the packets, RAN server 130 may inspect a portion of the packets (e.g., a header portion, a trailer portion, a label portion, etc.) that does not include a payload portion of the packets. In another example implementation, RAN server 130 may inspect any portion of the packets (e.g., headers, trailers, labels, payloads, etc.).

As also shown in FIG. 5, process 500 may include identifying a source address from a packet associated with the traffic (block 510) and obtaining information associated with a flow that corresponds to the source address (block 515). For example, RAN server 130 may identify a flow, associated with user device 110, based on a source address (e.g., an IP address, a MAC address, etc.) obtained from one or more packets associated with the flow.

RAN server 130 may obtain, from the packet and/or other packets associated with the source address, information associated with the flow that was identified by RAN server 130. For example, RAN server 130 may obtain, as a result of the monitoring, information associated with a content type being transported by the flow. For example, the content type may include, but is not limited to, streaming video, progressive download, a call, a message (e.g., based on an SMS protocol, MMS protocol, IM protocol, email protocol, etc.), a data session, etc.

In another example, RAN server 130 may identify, from the packet and/or other packets associated with the source address, a cell via which the flow is being transported to and/or from service provider network 160. Additionally, or alternatively, RAN server 130 may identify base station 120 with which the cell is associated.

As further shown in FIG. 5, process 500 may include storing the information associated with the flow and/or the source address (block 520) and sending a notification that includes the information, associated with the flow, as a result of monitoring the traffic (block 525). For example, RAN server 130 may store information, associated with the flow, in a data structure within in a memory associated with RAN server 130. The information associated with the flow may include the source address and/or the destination address. The information associated with the flow may include the information associated with the type of content being transported via the flow. The information associated with the flow may include the information associated with the cell (e.g., a cell ID) and/or information associated with base station 120 (e.g., a base station ID, etc.) with which the cell is associated.

RAN modeling server 130 may send a notification to AR server 210 that indicates that information associated with the flow, that corresponds to the source address, has been obtained. The notification may include the information associated with the flow and/or information associated with other flows that corresponds to the cell.

FIG. 6 is a diagram of an example data structure 600 that stores encoded location information, associated with user device 110, that is communicating via a RAN. Data structure 600 may include a collection of fields, such as a base station identifier (ID) field 602, a cell identifier (ID) field 604, a user device (UD) identifier (ID) field 606, a time at location field 608, a code length field 610, latitude code field 612, a longitude code field 614, and error code field 616. Data structure 600 includes fields 602-616 for explanatory purposes. In practice, data structure 600 may include additional fields, fewer fields, different fields, and/or differently arranged fields than are described with respect to data structure 600.

Cell ID field 602 may store information associated with a particular cell (such as, for example, a cell ID), within a RAN, that serves user device 110. Cell site location field 604 may store information associated with a particular location that corresponds to a cell site with which the particular cell is associated. In one example, the cell site may correspond to base station 120 with which the particular cell is associated. UD ID field 606 may store information associated with user device 110 (e.g., a MDN, an ESN, a SIM URI, an IMSI, and/or another identifier) that communicates with service provider network 160 via the particular cell. Time at location field 608 may store information associated with a quantity of time during which user device 110 is communicating via the particular cell and/or is located within a geo fence associated with the particular cell.

Code length field 610 may store a code length (e.g., a quantity of numeric values, alphabetical characters, alphanumeric values, bits, bytes, octets, etc.) that corresponds to one or more location codes (e.g., a latitude code, a longitude code, or some other location code) associated with the particular cell. Latitude code field 612 may store a location code, such as a latitude code, that corresponds to a coordinate associated with the particular location. In one example, the coordinate may be a latitude coordinate of the particular location and the latitude code may be an encoded version of the latitude coordinate. The latitude code may be a string of a certain length (e.g., a quantity of numerical values, alphabetical characters, alphanumeric values, bits, bytes, octets, etc.), that when decoded, represents a level of accuracy associated with the latitude coordinate.

Longitude code field 614 may store another location code, such as a longitude code, that corresponds to another coordinate associated with the particular location. In one example, the other coordinate may be a longitude coordinate of the particular location and the longitude code may be an encoded version of the longitude coordinate. The longitude code may be another string of a particular length (e.g., another quantity of numerical values, alphabetical characters, alphanumeric values, bits, bytes, octets, etc.), that when decoded, represents a level of accuracy associated with the longitude coordinate.

The certain length associated with the latitude code and/or the particular length, associated with the longitude code, may correspond to the code length stored in code length field 610. In one example, a sum of the certain length and the particular length may not be greater than the code length. Error code field 616 may store a quantity of error that corresponds to the code length identified in code length field 610.

AR server 210 may use the particular location, identified in cell site field 604, to generate a latitude code and/or longitude code associated with a maximum quantity of error. For example, AR server 210 may generate a latitude code (e.g., lat0) and/or a longitude code (e.g., long0) based on a latitude and/or longitude coordinate, respectively, associated with the particular location (e.g., as shown by ellipse 620). AR server 210 may generate the latitude code and/or longitude code using a hash function, a cryptographic hash function, and/or some other mathematical function. The latitude code and/or longitude code may be associated with a respective length that corresponds to a code length (e.g., length0) (e.g., as shown by ellipse 620). The latitude code and/or longitude code, when decoded, may correspond to a quantity of error (e.g., error0) relative to the particular location (e.g., as shown by ellipse 620). In one example, the quantity of error may correspond to a maximum quantity of error (e.g., +/−100, 1,000, 10,000 kilometers, etc. relative to the particular location) that is predetermined by logic associated with AR server 210. The error may correspond to a geo fence that encompasses a geographical area that surrounds the particular location in which the cell site and/or user device 110 is located.

In another example, AR server 210 may generate another latitude code (e.g., lat1) and/or another longitude code (e.g., long1) based on the latitude and/or longitude coordinate, respectively, associated with the particular location (e.g., as shown by ellipse 622). AR server 210 may generate the other latitude code and/or other longitude code using the hash function, the cryptographic hash function, and/or the other mathematical function. The other latitude code and/or other longitude code may be associated with another respective length that corresponds to another code length (e.g., length1) (e.g., as shown by ellipse 622). The other latitude code and/or other longitude code, when decoded, may correspond to another quantity of error (e.g., error1) relative to the particular location (e.g., as shown by ellipse 622). The other quantity of error may correspond to another geo fence that encompasses another geographical area that surrounds the particular location in which the cell site and/or user device 110 is located.

In one example, the other code length may be greater than the code length (e.g., where length1>length 0), which may enable the other quantity of error to be less than the quantity of error (e.g., where error1<max error). The other quantity of error may be associated with the other geo fence that encompasses the other geographical area that is less than the geographical area.

AR server 210 may, in a further example, generate further latitude codes 612 (e.g., lat2, lat3, etc.) and/or longitude codes 614 (e.g., long2, long3, etc.) that correspond to progressively increasing code lengths 610 (e.g., where length1<length 2<length 3, etc.) (e.g., as shown by ellipse 624). The further latitude codes 612 and/or longitudes codes 614 may, when decoded, be associated with progressively decreasing quantities of error (e.g., error2, error3, etc.). The further latitude codes 612 and/or longitude codes 614 may, when decoded, represent progressively decreasing quantities of error (e.g., error1>error 2>error3, etc.) (e.g., as shown by ellipse 624). The progressively decreasing quantities of error may correspond to progressively smaller geo fences within which the cell site and/or user device 110 are located.

In another example implementation, latitude code 612 and/or longitude code 614, when decoded, may represent coordinates other than latitude and/or longitude, respectively. For example, latitude code 612 and/or longitude code 614 may represent grid coordinates (e.g., X and/or Y, etc.) on a map associated with a geographic area within which the RAN is located. In another example, latitude code 612 and/or longitude code 614 may represent cylindrical coordinates (e.g., a radius centered at the particular location and/or an angle relative to some reference direction, such as, for example, due North, etc.) on the map associated with the geographic area.

Figure 7:
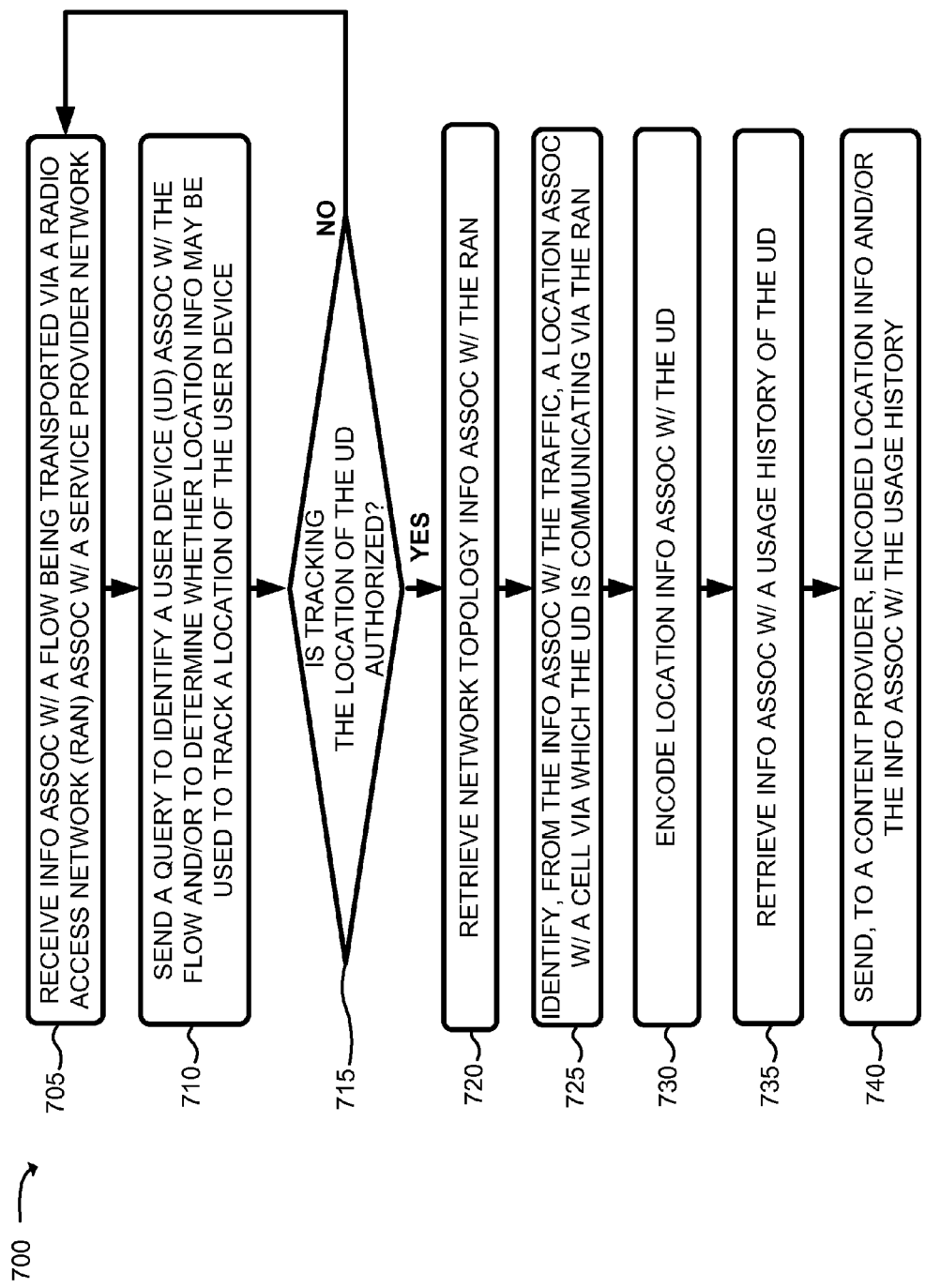
FIG. 7 is a flow chart of an example process for generating encoded location information associated with a user device that is communicating via a radio access network.

FIG. 7 is a flow chart of an example process for generating encoded location information associated with user device 110 that is communicating via a RAN. In one example implementation, process 700 may be performed by AR server 210. In another example implementation, some or all of process 700 may be performed by a device or collection of devices separate from, or in combination with, AR server 210.

As shown in FIG. 7, process 700 may include receiving information associated with a flow being transported via a RAN associated with a service provider network (block 705) and sending a query to identify a user device associated with the flow and/or to determine whether location information may be used to track a location of the user device (block 710). For example, AR server 210 may receive a notification from RAN server 130 that includes information associated with a flow being transported via a RAN. The flow may be transported via a cell within the RAN, that serves one or more user devices 110 that are communicating with service provider network 160. The information associated with the flow may include all or a portion of information stored in a data structure (e.g., data structure 400 of FIG. 4) as a result of RAN server 130 monitoring traffic being transported via the RAN.

AR server 210 may, in response to the notification, generate a query to identify which of the one or more user devices 110 are associated with the flow. Additionally, AR server 210 may generate the query to determine whether a user, of user device 110 that is identified as being associated with the flow, authorizes the use of location information, associated with user device 110, for tracking a location of the identified user device 110. AR server 210 may transmit the query to CO server 220, which includes all or a portion of the information associated with the flow.

CO server 220 may receive the query and may obtain a source address from the information associated with the flow. CO server 220 may use the source address to identify user device 110 with which the flow is associated from NAT bindings stored within a memory associated with CO server 220. CO server 220 may obtain, from the NAT bindings, information associated with user device 110 that corresponds to the source address. CO server 220 may retrieve, from another server device associated with service provider network 160 (e.g., a policy resource control function (PRCF) server; a home subscriber server (HSS); an authentication, authorization, and accounting (AAA) server; etc.), information associated with a user profile of a user of user device 110. The information associated with the user profile may identify parental controls specified by the user, preferred content (e.g., content genres, content types, etc.) as specified by the user, whether the user authorizes location information to be disclosed or used to track a location of user device 110. CO server 220 may transmit, to AR server 210, the information associated with user device 110 and/or the information associated with the user profile.

As also shown in FIG. 7, if tracking a location of the user device is not authorized (block 715—NO), then process 700 may include receiving information associated with another flow being transported via a RAN associated with a service provider network (block 705). For example, AR server 210 may receive the information associated with user device 110 and/or the information associated with the user profile. AR server 210 may determine, from the information associated with the user profile, that the user does not authorize the location information, associated with user device 110, to be used to track a location of user device 110. AR server 210 may not perform an operation to generate and/or encode the location information for the purpose of providing a location-based service to content provider 150. AR server 210 may receive information associated with another flow and may generate another query to identify another user device 110 and/or to determine whether another user, of the other user device 110, authorizes a location of the other user device 110 to be tracked.

As further shown in FIG. 7, if tracking a location of the user device is authorized (block 715—YES), then process 700 may include retrieving information associated with a network topology that corresponds to the RAN (block 720). For example, AR server 210 may receive the information associated with user device 110 and/or the information associated with the user profile. AR server 210 may determine, from the information associated with the user profile, that the user authorizes the location information, associated with user device 110, to be used to track the location of user device 110. AR server 210 may perform the operation to generate and/or encode the location information based on the determination that the user authorizes the location, of user device 110, to be tracked using the location information.

AR server 210 may retrieve, from a memory associated with AR server 210, information associated with a network topology associated with the RAN. The information associated with the network topology may identify a respective cell site for each cell within the RAN. In one example, the cell sites may correspond to a respective geographic location associated with each of base stations 120 with which the cells are associated. Each of the geographic locations may be identified by a set of coordinates (e.g., grid coordinates, latitude and/or longitude coordinates, etc.) within a geographical area associated with the RAN.

As yet further shown in FIG. 7, process 700 may include identifying a cell that is serving the user device associated with the flow and/or obtaining a geographic location associated with the cell (block 725). For example, AR server 210 may obtain information associated with a cell (e.g., a cell ID, a base station ID, etc.) via which user device 110 is communicating with service provider network 160. AR server 210 may use the information associated with the network topology to identify a geographic location associated with the cell. Additionally, or alternatively, AR server 210 may identify a geographic area that corresponds to a cell coverage area within which user device 110 is located while communicating with service provider network 160.

In another example implementation, AR server 210 may use an API to communicate with service provider network 160 to identify a location associated with user device 110. In yet another example implementation, AR server 210 may send a query to user device 110 to obtain the location of user device 110 (e.g., based on Global Positioning System (GPS) coordinates provided by user device 110).

As still further shown in FIG. 7, process 700 may include encoding location information associated with the user device (block 730). For example, AR server 210 may generate one or more location codes based on location information associated with user device 110. The location information may include the geographical location associated with the cell site and/or the geographic area associated with the cell coverage area. AR server 210 may generate the location codes using a hash function and/or some other mathematical function.

For example, AR server 210 may, in a manner similar to that described above (e.g., with respect to FIG. 6), generate a location code, based on the location information, that when decoded, represents a maximum quantity of error associated with the location information. The maximum quantity of error may correspond to a maximum geographic area in which user device 110 and/or the cell coverage area are located. The location code associated with the maximum quantity of error may be generated in a manner that a length of the location code corresponds to a minimum code length (e.g., a minimum quantity of bits to be include in the location code). The location code may be generated (e.g., using the hash function and/or the other mathematical function) using a particular key.

In another example, AR server 210 may, in a manner similar to that described above (e.g., with respect to FIG. 6), generate another location code, based on the location information, that when decoded, represents another quantity of error (e.g., that is less than the maximum quantity of error associated with the location information). The other quantity of error may correspond to a geographic area (e.g., that is less than the maximum geographic area) in which user device 110, the location associated with the cell site, and/or the cell coverage area are located. The other location code, associated with the other quantity of error, may be associated with another code length (e.g., that is greater than the minimum code length). The other location code may be generated (e.g., using the hash function and/or the other mathematical function) using another key that is different than the particular key.

AR server 210 may generate other location codes based on respective different code lengths and using respective different keys. A code length that is greater than another code length may enable AR server 210 to generate a location code, that when decoded, represents a quantity of error that is less than another quantity of error that corresponds to the other code length. In one example, the code length may correspond to a geographical area that is less than a coverage area associated with the cell. In another example, the code length may correspond to a maximum code length. The maximum code length may correspond to a minimum geographical area. The minimum geographical area may, for example, correspond to a particular location that corresponds to the cell site or a location associated with user device 110.

As also shown by FIG. 7, process 700 may include retrieving information associated with a usage history of the user device (block 735). For example, AR server 210 may retrieve, from a memory associated with AR server 210, information associated with a usage history of user device 110. The information associated with the usage history may include information associated with a location history of user device 110. The information associated with the location history may identify one or more geographic locations where user device 110 was located over a prior period of time. The information associated with the location history may include a respective time period during which user device 110 was located at each of the one or more locations. In another example, the information associated with the usage history may include a list of uniform resource locators (URLs) that were accessed by user device 110 during the prior period of time. In yet another example, the information associated with the usage history may include information associated with other user devices 110 (e.g., an MDN, etc.) with which user device 110 has communicated via one or more calls and/or messages (e.g., via a short message service (SMS) protocol, a multi-media service (MMS) protocol, an instant message (IM) protocol, and email protocol, etc.) in the prior period of time.

As further shown in FIG. 7, process 700 may include sending, to a content provider, the encoded location information and/or information associated with the usage history of the user device (block 740). For example, AR server 210 may send, to content provider 150 and via CO server 220, the information associated with the usage history of user device 110 and/or the encoded location information. Content provider 150 may receive the information associated with the location history and/or the encoded location information and may retrieve, from a memory associated with content provider 150, a key that was received from AR server 210 and/or CO server 220 at a prior point in time. Content provider 150 may use the key to decode one of the location codes stored in the encoded location information. Content provider 150 may obtain, from the decoded location code, information associated with a geographic location that corresponds to a cell site and/or base station 120. Content provider 150 may also obtain, from the decoded location information, a quantity of error associated with the geographic location. The cell and/or base station 120 may be associated with a cell via which user device 110 communicates or has communicated with service provider network 160.

Content provider 150 may use information associated with the geographic location and/or the quantity of error to identify a geo fence that encompasses a geographic area associated with the cell. Depending on the quantity of error, the geo fence may encompass a coverage area associated with the cell, may coincide with the coverage area of the cell, and/or may be encompassed by the coverage area of the cell. Content provider 150 may retrieve, from the memory, a list of advertising entities (e.g., advertisers, businesses, etc.) that are located within the geo fence. Content provider 150 may transmit, to CO server 220, advertising content and/or other content, associated with one or more the advertising entities. CO server 220 may receive the advertising content and may transmit the advertising content to user device 110 via service provider network 160 and/or the RAN.

Systems and/or methods, described herein, may enable information associated with traffic being transported over a radio access network (RAN), to be dynamically obtained by a RAN modeling server on a real-time basis. The systems and/or methods may enable the information associated with the traffic to be used to identify a cell, within the RAN, via which a user device is communicating with a service provider network associated with the RAN. The systems and/or methods may use the identified cell to obtain location information associated with the user device. The systems and/or methods may encode the location information to create one or more location codes (e.g., using one or more keys) that, when decoded, represent different levels of error associated with a particular location of the user device. The different levels of error correspond to different code lengths associated with the location codes. The systems and/or methods may transmit the one or more location codes to a content provider, which enables the content provider to use a key to decode one of the location codes. The systems and/or methods may permit the content provider to identify a geographical area, within which the user device is located, based the particular location and/or a particular quantity of error obtained from the decoded location code. The systems and/or methods may enable the content provider to transmit advertising content, associated with one or more advertising entities located within the geographical area, to the user device.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 5 and 7, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server associated with a service provider network, the method comprising:
   receiving, by the server and from a radio access network (RAN), information associated with a flow being transported via a cell, of a plurality of cells associated with the RAN, to or from the service provider network;
   identifying, by the server, a user device with which the flow is associated based on the information associated with the flow;
   retrieving, by the server and from a memory associated with the server, information associated with one or more locations that correspond to one or more cells of the plurality of cells;

identifying, by the server, a location, of the one or more locations, associated with the cell, of the one more cells, based on the information associated with the one or more locations;

encoding, by the server, information associated with the location, to create one or more location codes, where each of the one or more location codes, when decoded, represent a respective different geographical area in which the location or the user device are located; and transmitting, by the server and to a content provider, the one or more location codes, where the one or more location codes permit a geographical area that encompasses the user device or the location associated with the cell, to be identified, and advertising content to be targeted to the user device via the cell.

2. The method of claim 1, where the server is a RAN modeling server, the method further comprising:

monitoring traffic being transported via the plurality of cells associated with the RAN; and obtaining the information, associated with the flow, as a result of monitoring the traffic being transported via, the plurality of cells.

3. The method of claim 1, where identifying the user device with which the flow is associated further includes:

obtaining a network address from the information associated with the flow;

sending, to another server device, a query to obtain information associated with the user device, where the query includes the network address; and identifying the user device, based on the information associated with the user device.

4. The method of claim 3, wherein the other server device is a content optimization (CO) server associated with the service provider network, and wherein sending the query to obtain information associated with the user device enables the CO server to:

obtain the information associated with the user device from information associated with network address translation (NAT) bindings based on the network address.

5. The method of claim 1, further comprising:

sending a query to another server device, associated with the service provider network, to determine that a user, of the user device, has authorized information associated with the location to be used to track the location of the user device.

6. The method of claim 1, where encoding the information associated with the location to create the one or more location codes further includes:

obtaining a hash function and one or more keys from the memory; and generating, using the hash function and a key of the one or more keys, a location code, of the one or more location codes, based on the information associated with the location.

7. The method of claim 1, where encoding the information associated with the location to create the one or more location codes further includes:

retrieving, from the memory, one or more values associated with one or more code lengths;

generating a first location code, of the one or more location codes, that corresponds to a first code length, of the one or more code lengths, where the first code length is associated with a value, of the one or more values, that specifies a quantity of bits associated with the first location code, and where the first location code represents the cation of the user device associated with a first quantity of error.

8. The method of claim 7, further comprising:

generating a second location code, of the one or more location codes, that corresponds to a second code length, of the one or more code lengths, that is greater than the first code length, where the second location code represents the location of the user device associated with a second quantity of error, and where the second quantity of error associated with the location of the user device is less than the first quantity of error based on the second code length being greater than the first code length.

9. The method of claim 8, where the first quantity of error is associated with a first geographical area in which the user device is located, where the second quantity of error is associated with a second geographical area in which the user device is located, and where the second geographical area is smaller than the first geographical area.

10. A non-transitory computer-readable medium containing one or more instructions executable by one or more processors, the computer-readable medium comprising:

one or more instructions to receive information associated with a flow being transported via, a cell within a radio access network associated with a service provider network;

one or more instructions to identify a user device with which the flow is associated based on the information associated with the flow;

one or more instructions to identify a location of the user device based on a geographic location that corresponds to the cell;

one or more instructions to generate one or more location codes based on the geographic location, the one or more location codes corresponding to one or more code lengths and representing one or more quantities of error associated with the geographic location, where a particular location code, of the one or more location codes, is associated with:

a code length, of the one or more code lengths, that identifies a quantity of bits associated with the particular location code, and a quantity of error, of the one or more quantities of error, that corresponds to the code length;

one or more instructions to transmit, to a content provider, the one or more location codes, where transmitting the one or more location codes enables the content provider to:

decode the particular location code to obtain the quantity of error, the quantity of error corresponding to a geographical boundary in which the user device is located, and transmit content, to the user device and via the cell, where the content is associated with one or more advertising entities located within the geographical boundary.

11. The computer-readable medium of claim 10, where the one or more instructions to generate the one or more location codes further include:

one or more instructions to retrieve the one or more code lengths, where the one or more code lengths correspond to the one or more quantities of error.

12. The computer-readable medium of claim 10, where the one or more instructions to generate the one or more location codes further include:
  one or more instructions to retrieve one or more keys with which to generate the one or more location codes;
  one or more instructions to select a key, of the one or more keys, based on a determination that the content provider is authorized to decode the particular location code; and
  one or more instructions to transmit the selected key, of the one or more keys, to the con provider that enables the content provider to decode the particular location code.

13. The computer-readable medium of claim 10, where the one or more location codes are generated using a hash function or a cryptographic hash function.

14. The computer-readable medium of claim 10, where a first location code, of the one or more location codes, is associated with a first code length, of the one or more code lengths,
  where a second location code, of the one or more location codes, is associated with a second code length, of the one or more code lengths, and
  where a first quantity of error, of the one or more quantities of error, associated with the first location code is greater than a second quantity of error, of the one or more quantities of error, when the first code length is smaller than the second code length.

15. The computer-readable medium of claim 14, where a first geographical area corresponds to the first quantity of error,
  where a second geographic area corresponds to the second quantity of error, and
  where the first geographic area is larger than the second geographic area based on the first quantity of error being greater than the second quantity of error.

16. A computing device associated with a service provider network, the computing device comprising:
  a memory to store information regarding a plurality of geographic coordinates associated with a plurality of cell sites within a radio access network (RAN); and
  one or more processors to:
    monitor traffic being transported via a cell associated with one of the plurality of cells sites,
    obtain, as a result of the monitoring, information associated a flow,
    identify a user device with which the flow is associated based on the information associated with the flow;
    determine a location of the user device based on geographical coordinates, of the plurality of geographic coordinates, associated with the one of the plurality of cell sites;
    generate one or more location codes based on the geographic coordinates, the one or more location codes corresponding to one or more code lengths and representing one or more quantities of error associated with the geographic coordinates, where a particular location code, of the one or more location codes, is associated with:
      a code length, of the one or more code lengths, that indicates a quantity of bits associated with the particular location code, and
      a quantity of error, of the one or more quantities of error, that corresponds to the code length and a geographical boundary that encompasses a geographical area in which the user device is located; and
    transmit, to a content provider, the particular location code that permits advertising content to be targeted to the user device based on advertising entities located with the geographic boundary that corresponds to the quantity of error.

17. The computing device of claim 16, where, when monitoring the traffic being transported via the cell, the one or more processors are to:
  monitor one or more interfaces between the one of the plurality of cell sites and the service provider network, where the one or more interfaces include:
    a first interface associated with one or more signal bearers that transport the flow via the service provider network, and
    a second interface, associated with control signals, that control the one or more signal bearers to establish or execute a communication session that enables the user device to communicate with the service provider network.

18. The computing device of claim 16, where, when identifying the user device, the one or more processors are to:
  obtain a network address from a packet associated with the flow;
  generate a query that includes the network address; and
  transmit, to a server device associated with the service provider network, the query to obtain information associated with the user device that corresponds to the network address.

19. The computing device of claim 16, where increasing the quantity of bits associated with the particular location code corresponds to a decreasing quantity of error, associated with the geographic coordinates.

20. The computing device of claim 16, where, when generating the one or more location codes, the one or more processors are further to:
  obtain, from the memory, the one or more code lengths,
    where a first code length, of the one or more code lengths, is associated with a first quantity of bits that are permitted within a first location code of the one or more location codes,
    where a second code length, of the one or more code lengths, is associated with a second quantity of bits that are permitted within a second location code of the one or more location codes, and
    where a first quantity of error, that is represented by the first location code, is greater than a second quantity of error that is represented by the second location code, when the first quantity of bits value is less than the second quantity of bits.

21. The computing device of claim 16, where the one or more processors are further to:
  transmit a key, of one or more keys, to the content provider, where the one or more keys correspond to the one or more location codes, where the key corresponds to the particular location code, and where transmitting the key permits the content provider to:
    decode the particular location code to obtain the quantity of error, and
    generate the geographic boundary based on the quantity of error.

* * * * *